United States Patent [19]
Ide

[11] Patent Number: 5,696,891
[45] Date of Patent: Dec. 9, 1997

[54] PRINTING APPARATUS AND METHOD FOR STORING VARIOUS PRINTING PARAMETERS

[75] Inventor: Hiroyasu Ide, Yokohama, Japan

[73] Assignee: Canon Kabushiki Kaisha, Tokyo, Japan

[21] Appl. No.: 258,595

[22] Filed: Jun. 10, 1994

Related U.S. Application Data

[63] Continuation of Ser. No. 948,600, Sep. 23, 1992, abandoned.

[30] Foreign Application Priority Data

Sep. 26, 1991 [JP] Japan .................................. 3-247633
Sep. 17, 1992 [JP] Japan .................................. 4-248007

[51] Int. Cl.$^6$ ........................................ G06K 15/00
[52] U.S. Cl. ........................................ 395/112; 395/101
[58] Field of Search ........................ 395/101, 114, 395/115, 112, 110, 518, 517, 520, 828, 830, 834, 882, 892–894; 400/70, 72–73, 76, 83, 61, 62

[56] References Cited

U.S. PATENT DOCUMENTS

| | | |
|---|---|---|
| 4,846,597 | 7/1989 | Bryant et al. ........................ 400/83 |
| 4,891,769 | 1/1990 | Tasaki .................................. 364/519 |
| 5,036,476 | 7/1991 | Yamaguchi et al. ................ 395/112 |
| 5,075,874 | 12/1991 | Steeves et al. ..................... 395/112 |
| 5,126,951 | 6/1992 | Stapleton . |

FOREIGN PATENT DOCUMENTS

| | | | |
|---|---|---|---|
| 0415861A2 | 3/1991 | European Pat. Off. ............. 395/114 |
| 2214338 | 8/1989 | United Kingdom . | |
| 2220286 | 4/1990 | United Kingdom ............... 395/115 |

*Primary Examiner*—Arthur G. Evans
*Attorney, Agent, or Firm*—Fitzpatrick, Cella, Harper & Scinto

[57] ABSTRACT

In a printing apparatus, an operation panel includes an LED display unit for displaying various kinds of states of the apparatus, an LCD display unit, and a switch unit for setting various kinds of parameters of the apparatus, test printing and the like. By operating the switch unit, a plurality of various kinds of parameter settings, such as the selection of paper cassettes, external interfaces, page description languages and the like, and combinations of the setting set by operating the switch unit can be registered in a setting storage unit using a setting registration switch. An arbitrary one of the plurality of set contents registered in the setting storage unit is called using a setting calling switch, and is displayed on the LED display unit or the LCD display unit. After printing has been started, printing is executed in accordance with the set contents displayed on the display unit.

25 Claims, 8 Drawing Sheets

PRINTING APPARATUS AND METHOD FOR STORING VARIOUS PRINTING PARAMETERS

This application is a continuation of application Ser. No. 07/948,600 filed Sep. 23, 1992, now abandoned.

BACKGROUND OF THE INVENTION

1. Field of the Invention

This invention relates to a printing apparatus which can rapidly execute setting of various kinds of parameters.

2. Description of the Related Art

In a conventional printing apparatus, when setting various kinds of parameters, such as the selection of a paper cassette, an external interface, a page description language and the like, various kinds of set items are selected using operation-panel switches, whereby respective items are set. Hence, for each user, various kinds of items must be set from the beginning.

Furthermore, in setting the various kinds of items, while a large number of set items are present, the number of switches is small. Hence, a large number of switching operations are needed, and it takes a long time to master a series of switching operations required for switching various kinds of modes and settings, causing a great burden on the user.

SUMMARY OF THE INVENTION

It is an object of the present invention to provide a printing apparatus which reduces a burden on the user caused by the above-described setting of various kinds of contents, parameters or items.

According to one aspect, the present invention which achieves this objective relates to a printing apparatus comprising storage means for storing a plurality of various kinds of set contents including interface information of the printing apparatus, reading means for reading assigned desired set contents from the storage means, and control means for controlling the printing apparatus according to the desired set contents read by the reading means.

The various kinds of set contents further include page description language, and the kind, the pitch and the point size of a font.

The reading means reads the desired set contents according to assigning information input from an external apparatus.

The reading means reads the desired set contents according to assigning information assigned from a panel operation unit of the printing apparatus.

The storage means stores the various kinds of set contents input from the external apparatus.

According to another aspect, the present invention which achieves the above-described objective relates to a printing apparatus comprising storage means for storing a plurality of various kinds of set contents including interface information of the printing apparatus and identifying information corresponding to the set contents, reading means for reading the corresponding set contents from the storage means according to assigned identifying information, and control means for controlling the printing apparatus according to the set contents read by the reading means.

The various kinds of set contents further include page description language, and the kind, the pitch and the point size of a font.

The reading means reads the set contents according to identifying information input from an external apparatus.

The reading means reads the set contents according to identifying information assigned from a panel operation unit of the printing apparatus.

The storage means stores various kinds of set contents input from the external apparatus.

According to still another aspect, the present invention which achieves the above-described objective relates to a printing method comprising the steps of storing a plurality of various kinds of set contents including interface information of the printing apparatus, reading desired set contents from the stored various kinds of set contents, and controlling the printing apparatus according to the set contents read in the reading step.

The various kinds of set contents further include page description language, and the kind, the pitch and the point size of a font.

In the reading step the desired set contents are read according to assigning information input from the external apparatus.

In the reading step the desired set contents are read according to assigning information assigned from a panel operation unit of the printing apparatus.

In the storage step various kinds of set contents input from the external apparatus are stored.

According to still another aspect, the present invention which achieves the above-described objective relates to a printing method comprising the steps of storing a plurality of various kinds of set contents including interface information of the printing apparatus and identifying information corresponding to the set contents, reading the corresponding set contents from the stored various kinds of set contents according to assigned identifying information, and controlling the printing apparatus according to the set contents read in the reading step.

The various kinds of set contents further include page description language, and the kind, the pitch and the point size of a font.

In the reading step the desired set contents are read according to identifying information input from the external apparatus.

In the reading step the desired set contents are read according to identifying information assigned from a panel operation unit of the printing apparatus.

In the storage step various kinds of set contents input from the external apparatus are stored.

Accordingly, in the printing apparatus of the present invention, the reading means reads assigned desired set contents from the storage means for storing a plurality of various kinds of set contents including interface information of the printing apparatus, and control means controls the printing apparatus according to the set contents read by the reading means.

In the printing apparatus of the present invention, the reading means reads the corresponding set contents according to assigned identifying information from the storage means for storing a plurality of various kinds of set contents including interface information of the printing apparatus and identifying information corresponding to the set contents, and the control means controls the printing apparatus according to the set contents read by the reading means.

In the printing method of the present invention, in the reading step, assigned desired set contents are read from a plurality of various kinds of set contents including interface information of the printing apparatus which have previously been stored, and in the control step, the printing apparatus is controlled according to the set contents read in the reading step.

In the printing method of the present invention, in the reading step, the corresponding set contents are read from a plurality of various kinds of set contents including interface information of the printing apparatus and identifying information corresponding to the set contents which have previously been stored according to assigned identifying information, and in the control step, the printing apparatus is controlled according to the set contents read in the reading step.

As described above, according to the present invention, by registering set contents which are frequently used, such as the kinds of paper cassettes, external interfaces and page description languages, the kinds, pitches and point sizes of fonts, and the like, in a setting storage unit, a large number of switching operations required in setting various kinds of parameters of a printing apparatus become unnecessary. As a result, a burden on the user caused by a complicated setting method is reduced, and anybody can easily set and call set contents of the printing apparatus.

DESCRIPTION OF THE PREFERRED EMBODIMENTS

Figure 1:
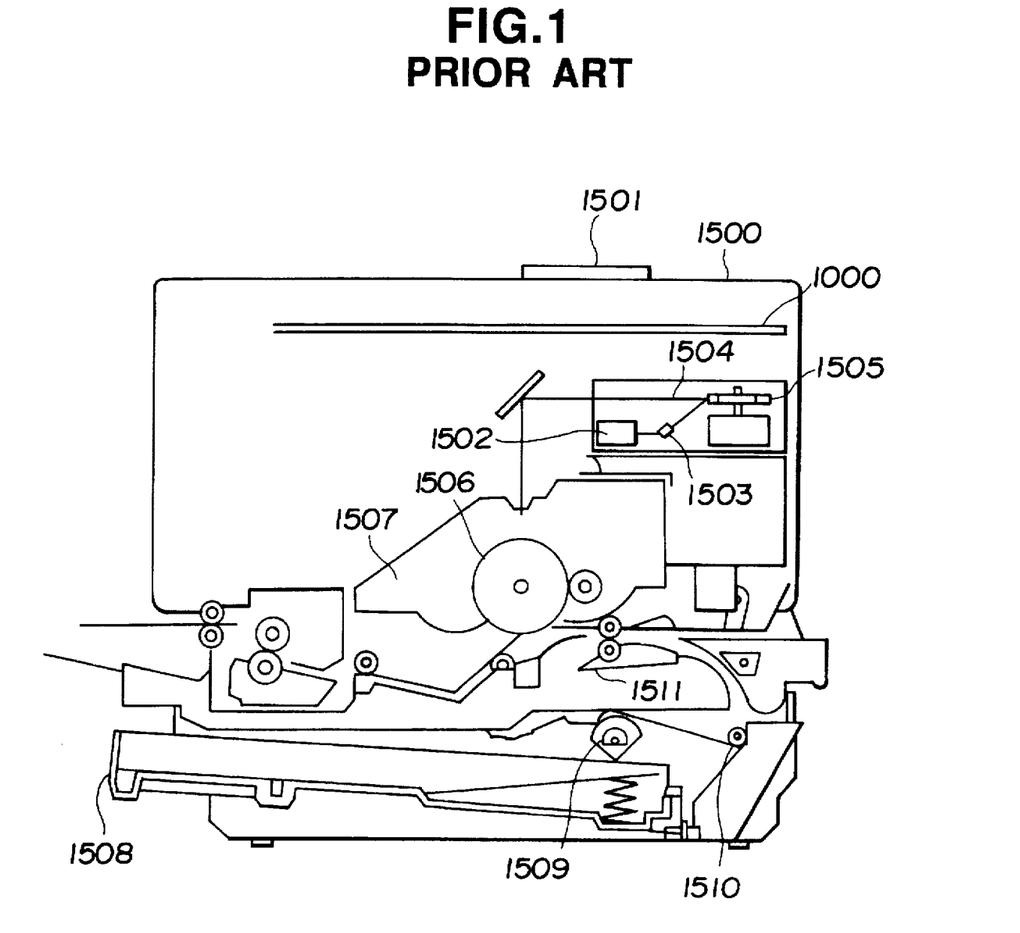
FIG. 1 is a cross-sectional view showing the configuration of a first printing apparatus to which the present invention can be applied.
Figure 2:
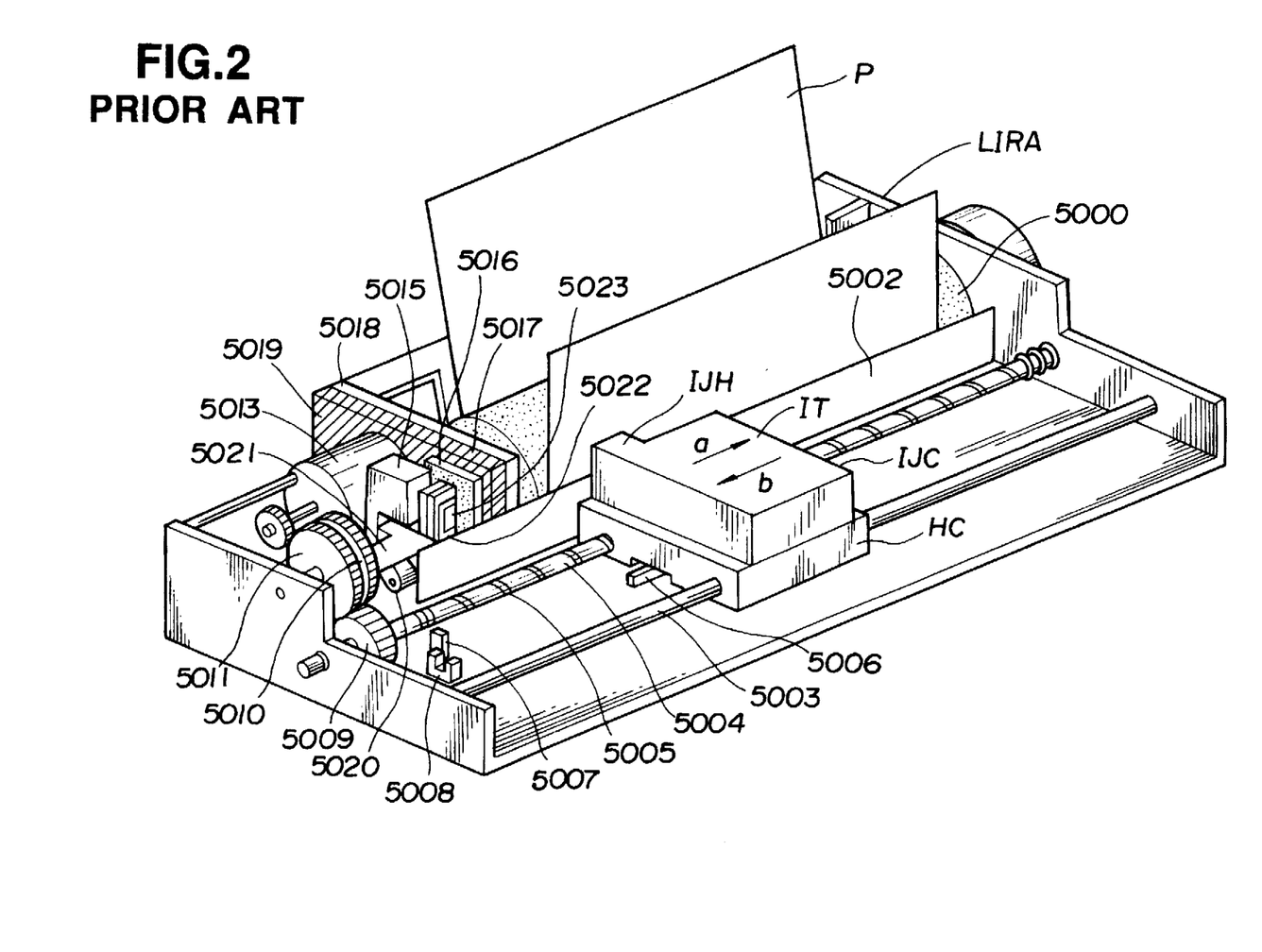
FIG. 2 is a diagram illustrating an external appearance showing the configuration of a second printing apparatus to which the present invention can be applied.

Before explaining the configuration of the present invention, an explanation will be provided of the configuration of a laser-beam printer and a ink-jet printer, to which the present invention is suitably applied, with reference to FIGS. 1 and 2.

The printer to which the present invention is applied is not limited to the laser-beam printer or the ink-jet printer, but any other type of printer may, of course, be used.

FIG. 1 is a cross-sectional view showing the configuration of a first printing apparatus to which the present invention can be applied, for example, a laser-beam printer (hereinafter abbreviated as an LBP).

In FIG. 1, a main body 1500 of the LBP receives and stores printing information (character codes and the like), form information, macro commands and the like supplied from an external apparatus, such as a host computer or the like connected to the main body 1500, forms corresponding character patterns, form patterns and the like in accordance with the received information, and forms an image on recording paper, serving as a recording medium. An operation panel 1501 is provided with switches for operations, an LED (light-emitting diode) display unit and the like. A printer control unit 1000 controls the entirety of the main body 1500, and analyzes character information and the like supplied from the external apparatus. The printer control unit 1000 mainly converts character information into video signals representing the corresponding character patterns, and outputs the video signals to a laser driver 1502. The laser driver 1502 includes circuitry for driving a semiconductor laser 1503, and performs on-off switching of laser light 1504 emitted from the semiconductor laser 1503 in accordance with the input video signals. The laser light 1504 is deflected in rightward and leftward directions by a rotating polygon mirror 1505 so as to scan and expose the surface of an electrostatic drum 1506. An electrostatic latent image corresponding to the character patterns is thereby formed on the electrostatic drum 1506. The electrostatic latent image is developed by a developing unit 1507 disposed around the electrostatic drum 1506, and the developed image is transferred onto recording paper. Cut sheets are used as the recording paper. The cut-sheet recording paper is accommodated within a paper cassette 1508 mounted on the main body 1500. A sheet of the recording paper is fed within the apparatus by a paper feeding roller 1509, a conveying roller 1510 and conveying rollers 1511, and is supplied to the electrostatic drum 1506.

FIG. 2 is a diagram illustrating an external appearance of a second printing apparatus to which the present invention can be applied, for example, an ink-jet printing apparatus (an IJRA).

In FIG. 2, a carriage HC engaging a screwed groove 5005 of a lead screw 5004 rotating via driving-force transmission gears 5011 and 5009 meshed for movement with the normal/reverse rotation of a driving motor 5013 includes a pin (not shown), and is reciprocated in the directions of arrows "a" and "b". An ink-jet cartridge IJC is mounted on the carriage HC. A paper-pressing plate 5002 presses paper against a platen 5000 over the moving direction of the carriage HC. Photocouplers 5007 and 5008 function as home-position detection means for, for example, confirming the presence of a lever 5006 of the carriage HC in the region where the photocouplers 5007 and 5008 are present, and performing switching of the direction of the rotation of the motor 5013. A member 5016 supports a cap member 5022 for capping the entire surface of a recording head IJH. A suction pump 5015 sucks the inside of the cap member 5022, and performs a recovering operation of the recording head by suction via an opening 5023 of the cap member 5022. A cleaning blade 5017 is movable in back-and-forth directions by means of a member 5019. A supporting plate 5018 supports the cleaning blade 5017 and the member 5019. A lever 5021 is used to start suction for recovery, and moves in accordance with the movement of a cam 5020 engaging the carriage HC. The driving force of the driving motor 5013 is transmitted by a known transmission means, such as a cluch or the like.

As for the above-described capping, cleaning, and recovery by suction, the apparatus is configured so that desired processing is performed at the corresponding position by the operation of the lead screw 5004 when the carriage HC reaches the home-position-side region. Any configuration may be adopted provided that a desired operation can be performed at a well-known timing.

Setting of various kinds of parameters of the second printing apparatus shown in FIG. 2 are performed via an operation panel (not shown) in which switches for operations, an LED display and the like are disposed.

Figure 3:
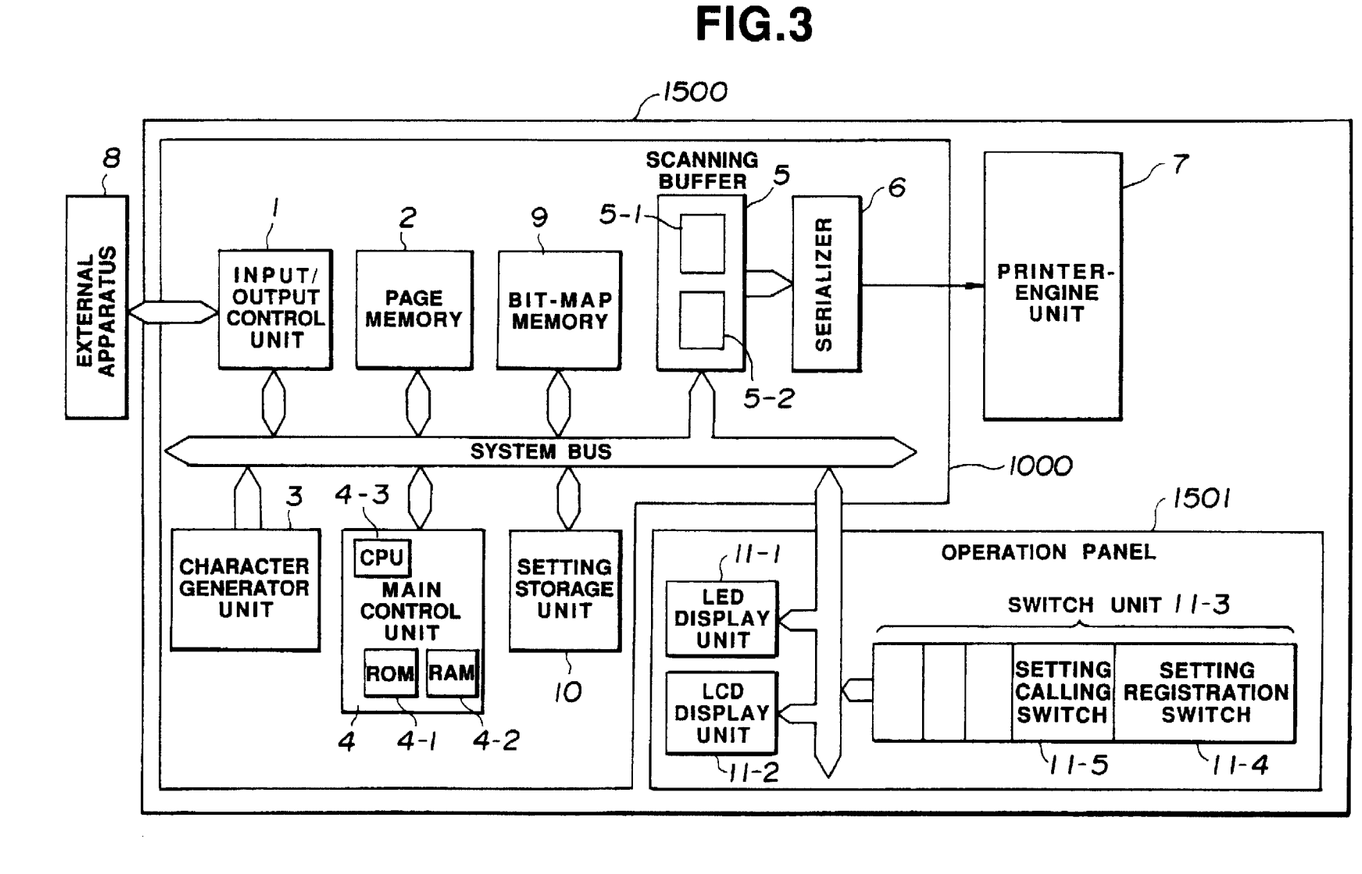
FIG. 3 is a block diagram showing the configuration of a printing apparatus according to a first embodiment of the present invention.

FIG. 3 is a block diagram showing the configuration of a printing apparatus according to a first embodiment of the present invention. Although an explanation will be provided illustrating the laser-beam printer shown in FIG. 1, the ink-jet printer shown in FIG. 2 or any other type of printing apparatus may also be used.

In FIG. 3, an input/output control unit 1 receives document information, image data, commands to call various kinds of settings registered in the apparatus, and the like input from an external apparatus 8, such as a host computer or the like, or outputs setting information of the apparatus, and the like to the external apparatus 8. Image data and the like input from the external apparatus 8 via the input/output control unit 1 are stored in a page memory 2 having a capacity for at least one page. The data to be stored in the page memory 2 comprise image information, document information, control codes for assigning emphasis of characters, and the like. A character-generator unit 3 inputs character-code information when the document information stored in the page memory 2 comprises the character-code information, and outputs the corresponding pattern data to a main control unit 4. A bit-map memory 9 develops bit data and the like patterned by the character-generator unit 3.

The main control unit 4 controls the entirety of the printing apparatus, and includes, for example, a CPU (central processing unit) 4-3, such as a microprocessor or the like, a ROM (read-only memory) 4-1 for storing various kinds of data, such as control programs (flowcharts shown in FIGS. 4 and 6, and the like), and a RAM (random access memory) 4-2 used as a work area, and the like.

A scanning buffer 5 includes buffers 5-1 and 5-2 for storing image data used for one-line scanning of a laser beam. The reason why the two buffers are provided is that even if one of them outputs data to a printer-engine unit 7 via a serializer 6, the other buffer can store data for the next line. When one buffer has completed the output of data for one line, the other buffer starts to output data, and data for the next line are transferred to the buffer which has just completed the output of the data. Thereafter, processing is alternately switched to the respective buffers. Thus, high-speed processing is performed.

An operation panel 1501 includes a reading device comprising an LED (light-emitting diode) display unit 11-1 and an LCD (liquid-crystal display) display unit 11-2, and a switch unit 11-3 for setting various kinds of parameters of the printing apparatus, test printing and the like.

Various kinds of parameter settings, such as a plurality of the kinds of paper cassettes, external interfaces, page description languages, the kinds, pitches, and point sizes of fonts, and the like, or combinations of the settings set by operating the switch unit 11-3 can be registered in a storage device or a setting storage unit 10. The registration and calling or retrieving of a combination of various kinds of settings can be performed by a setting registration switch 11-4 and a setting calling switch 11-5, respectively.

Figure 4:
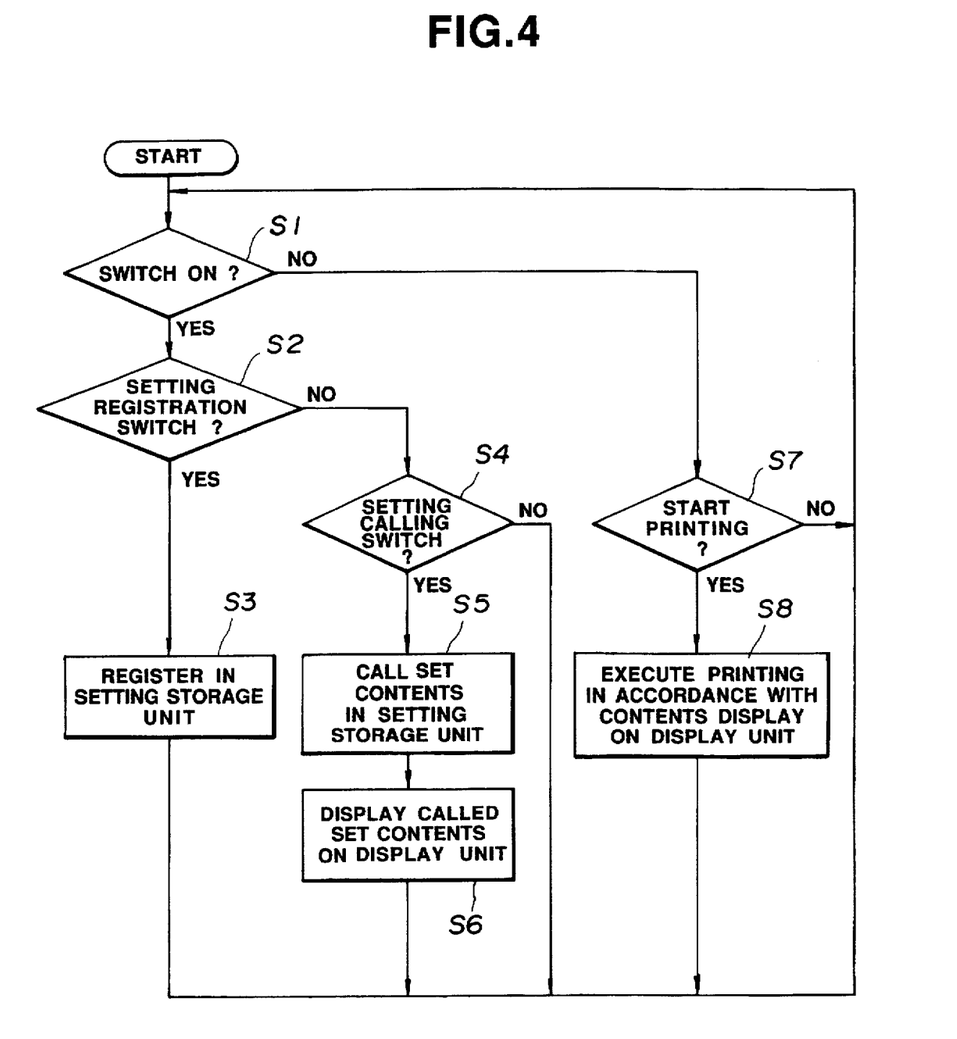
FIG. 4 is a flowchart of a control program used in the first embodiment.

The operation of the present embodiment will now be explained in detail with reference to the flowchart shown in FIG. 4.

Various kinds of parameter settings set by operating the operation switch unit 11-3 are displayed on the LED display unit 11-1 or the LCD display unit 11-2. If the setting registration switch 11-4 is depressed when the setting operation has been completed (step S2), the contents of the setting are written and registered in a memory device provided within the setting storage unit 10 (step S3). By repeating the above-described operation, it is possible to register a plurality of set contents in the setting registration unit 10.

On the other hand, if the setting calling switch 11-5 is depressed (step S4), the CPU 4-3 within the main control unit 4 reads one of the set contents registered in the setting storage unit 10, and switches the setting of the main body of the apparatus (step S5), and displays the read set contents on the LED display unit 11-1 or the LCD display unit 11-2 (step S6).

If the setting calling switch 11-5 is depressed again, the setting is switched to another registered setting. Thus, the desired set contents can be selected.

A nonvolatile memory, such as a flash memory, an EEPROM (electrically erasable/programmable read-only memory), an NVRAM (nonvolatile random access memory) or the like, an SRAM (static random access memory) backed up by a battery, or the like, is used as the memory device within the setting storage unit 10 so that the memory's contents are not lost even if the power supply of the main body of the apparatus is turned off.

Alternatively, when the power supply of the main body of the apparatus is turned off, the contents set immediately before the turning-off may be written in the memory device within the setting storage unit 10 in accordance with a program stored within the ROM 4-1. When the power supply is turned on again, the CPU 4-3 may read the settings stored in the setting storage unit 10 immediately before the power supply has been turned off stored in the setting storage unit 10, whereby the setting of the main body of the apparatus is performed.

When printing data have been actually transmitted while the connection between the printing apparatus and the external apparatus 8 is in an on-line state, a printing operation is performed in accordance with the set contents displayed on the LCD unit 11-2 at that time (step S8).

Although in the above-described first embodiment, the registration and calling of various kinds of setting or combinations of the setting are executed by operating the setting registration switch 11-4 and the setting calling switch 11-5 provided on the switch unit 11-3, respectively, the present invention is not limited to such an operation.

For example, the registration Or calling of various kinds of setting or combinations of the setting may be executed by a command from the external apparatus 8.

Figure 8:
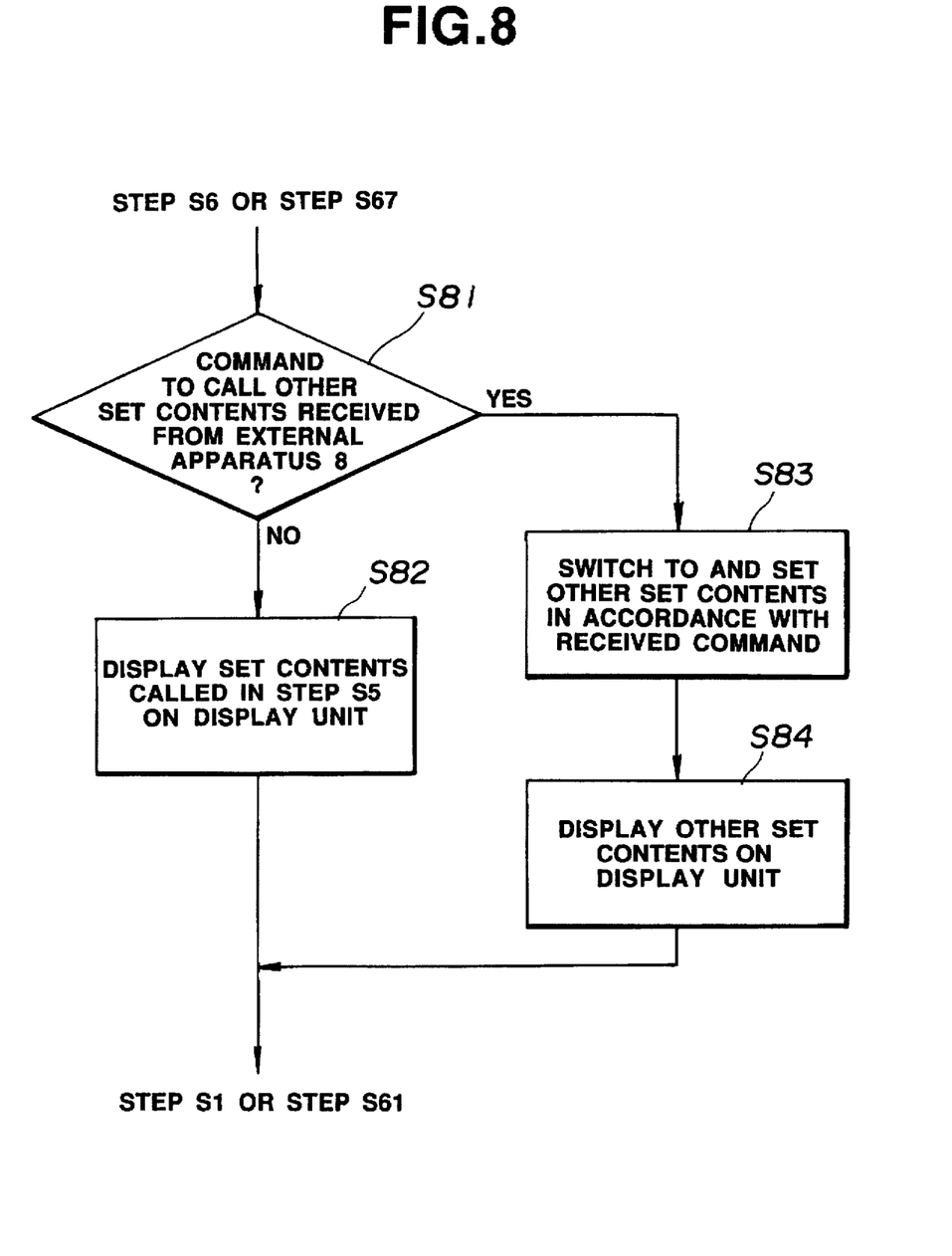
FIG. 8 is a flowchart of a control program used in the first, second and third embodiments.

In such a case, priority may be given to a command from the external apparatus 8 in accordance with the flowchart shown in FIG. 8.

An explanation will be provided of such an operation with reference to the flowchart shown in FIG. 8. If a command to call other set contents has been received from the external apparatus 8 in step S81, the setting is switched to the other set contents in accordance with the received command in step S83, and the contents are displayed on the display unit in step S84. This flowchart is inserted after step S6 of the flowchart shown in FIG. 4, or step S67 of the flowchart shown in FIG. 6 (to be described later), and the process returns to step S1 or step S61 shown in FIG. 6 (to be described later).

As explained above, according to the first embodiment, by registering setting conditions which are frequently used in the setting registration unit 10, a large number of key operations required when various kinds of setting of the printing apparatus are performed becomes unnecessary, whereby a burden on the user caused by a complicated setting method is reduced, and everybody can easily perform setting of the printing apparatus.

Although in the present embodiment, an explanation has been provided illustrating the laser-beam printer shown in FIG. 1, the application of the present invention is not limited to such a printer.

In addition, the present invention may, of course, be applied to a case in which the object of the invention is achieved by supplying a system or an apparatus with a program.

Figure 5:
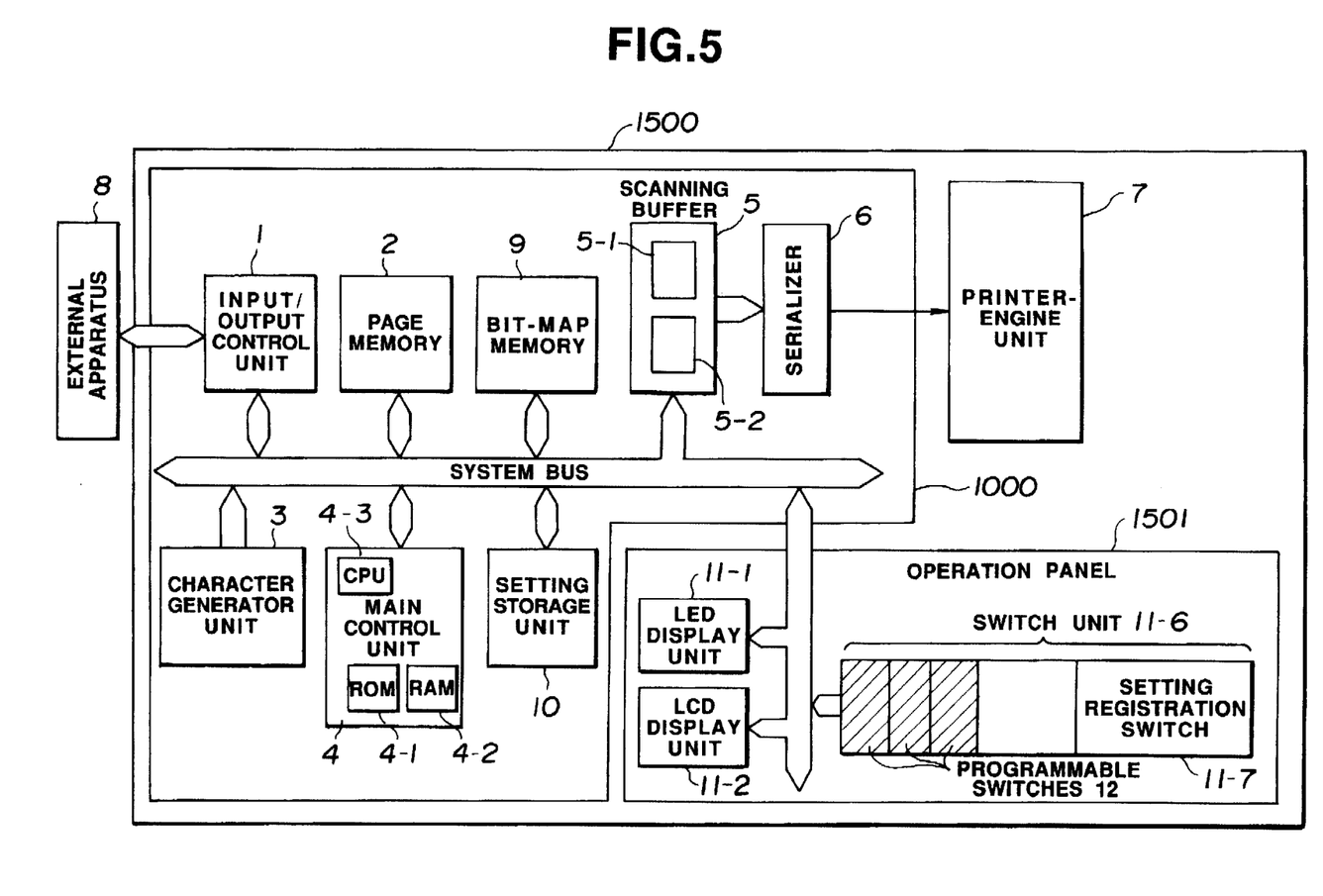
FIG. 5 is a block diagram showing the configuration of a printing apparatus according to a second embodiment of the present invention.

Next, an explanation will be provided of a second embodiment of the present invention with reference to FIG. 5.

FIG. 5 is a diagram showing an example of the configuration of a printing apparatus which can arbitrarily set the functions of operation-panel switches. Since components other than a switch unit 11-6 and programmable switches 12 are the same as those shown in FIG. 3, an explanation thereof will be omitted.

Settings of various kinds of parameters, such as the selection of a paper cassette, an external interface, a page description language and the like, or combinations of the settings set by operating the switch unit 11-6 or by the external apparatus 8 are registered in the setting storage unit 10 using a setting registration switch 11-7. At that time, by setting to which programmable switch 12 each setting corresponds, the user can arbitrarily determine the correspondence between each of the registered contents and each of the programmable switches.

The set contents registered in the setting storage unit 10 can be called by operating the programmable switch 12 corresponding to each of the contents.

Figure 6:
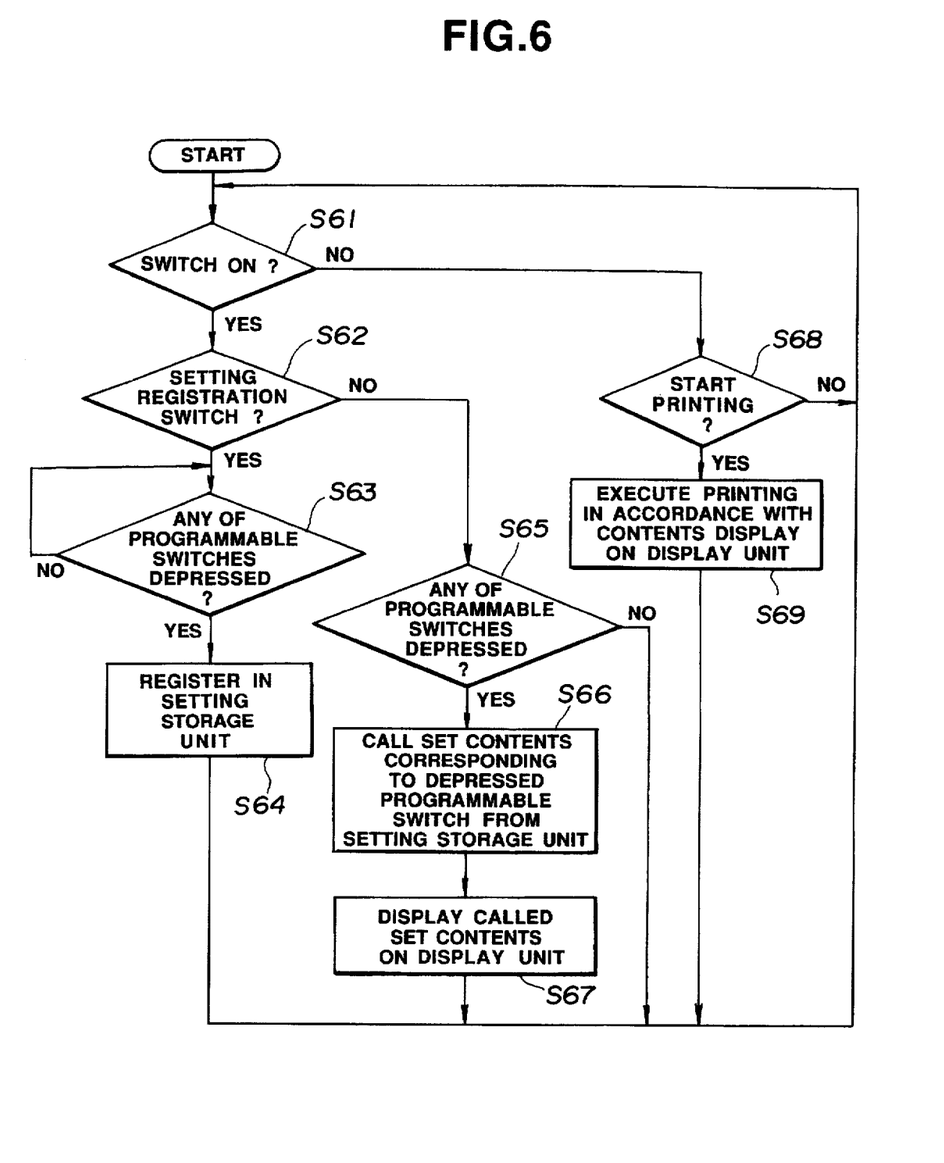
FIG. 6 is a flowchart of a control program used in the second embodiment.

The operation of the second embodiment will now be explained in detail with reference to the flowchart shown in FIG. 6.

Various kinds of setting information set by operating the operation-switch unit 11-6 are dislayed on the LED display unit 11-1 or the LCD display unit 11-2. When the setting has been completed, the setting registration switch 11-7 is depressed (step S62). By depressing any of the programmable switches 12, the set contents registered in step S62 can correspond to the depressed programmable switch 12 (step S63). In step S64, the set contents are written and registered in the memory device within the setting storage unit 10 together with identifying information of the corresponding programmable switch. By repeating the above-described operation, a plurality of set contents can be registered in the setting storage unit 10.

If it is determined that the setting registration switch 11-7 has not been depressed in step S62, it is determined whether or not any of the programmable switches 12 have been depressed (step S65). If the result of the determination is affirmative, the CPU 4-3 within the main control unit 4 reads the set contents corresponding to identifying information of the depressed programmable switch (step S66) and switches the setting of the main body of the apparatus, and displays the read set contents on the LED display unit 11-1 or the LCD display unit 11-2 (step S67).

As described above, by dpressing any of the programmable switches 12, the setting is switched to another registered setting, whereby the desired set contents can be selected.

A nonvolatile memory, such as a flash memory, an EEPROM (electrically erasable/programmable read-only memory), an NVRAM (nonvolatile random access memory) or the like, an SRAM (static random access memory) backed up by a battery, or the like, is used as the memory device within the setting storage unit 10 so that the memory's contents are not lost even if the power supply of the main body of the apparatus is turned off.

Alternatively, when the power supply of the main body of the apparatus is turned off, the contents set immediately before the turning-off may be written in the memory device within the setting storage unit 10 in accordance with a program stored within the ROM 4-1. When the power supply is turned on again, the CPU 4-3 may read the settings stored in the setting storage unit 10 immediately before the power supply has been turned off, whereby the setting of the main body of the apparatus is performed.

When printing data have been actually transmitted while the connection between the printing apparatus and the external apparatus 8 is in an on-line state, a printing operation is performed in accordance with the set contents displayed on the LCD unit 11-2 at that time (step S69).

Although in the above-described second embodiment, the registration and calling of various kinds of setting or combinations of the setting are executed by operating the setting registration switch 11-7 and the programmable switches 12 provided on the switch unit 11-6, respectively, the present invention is not limited to such an operation.

For example, the registration or calling of various kinds of setting or combinations of the setting may be executed by a command from the external apparatus 8.

In such a case, priority may be given to a command from the external apparatus 8 in accordance with the flowchart shown in FIG. 8.

An explanation will be provided of such an operation with reference to the flowchart shown in FIG. 8. If a command to call other set contents has been received from the external apparatus 8 in step S81, the setting is switched to the other set contents in accordance with the received command in step S83, and the contents are displayed on the display unit in step S84. This flowchart is inserted after step S67 of the flowchart shown in FIG. 6, and the process returns to step S61 shown in FIG. 6.

As explained above, according to the second embodiment, by registering setting conditions which are frequently used in the setting registration unit 10, a large number of key operations required when various kinds of settings of the printing apparatus are performed becomes unnecessary, whereby a burden on the user caused by a complicated setting method is reduced, and everybody can easily perform setting of the printing apparatus. In addition, when performing various kinds of settings for the printing apparatus, by registering the set contents in the setting storage unit 10 so that each of the set contents corresponds to one of the programmable switches 12, a burden on the user caused by a complicated setting method is reduced, and everybody can easily set and call set contents of the printing apparatus.

Although in the present embodiment, an explanation has been provided illustrating the laser-beam printer shown in FIG. 1, the application of the present invention is not limited to such a printer.

In addition, the present invention may, of course, be applied to a case in which the object of the invention is achieved by supplying a system or an apparatus with a program.

Figure 7:
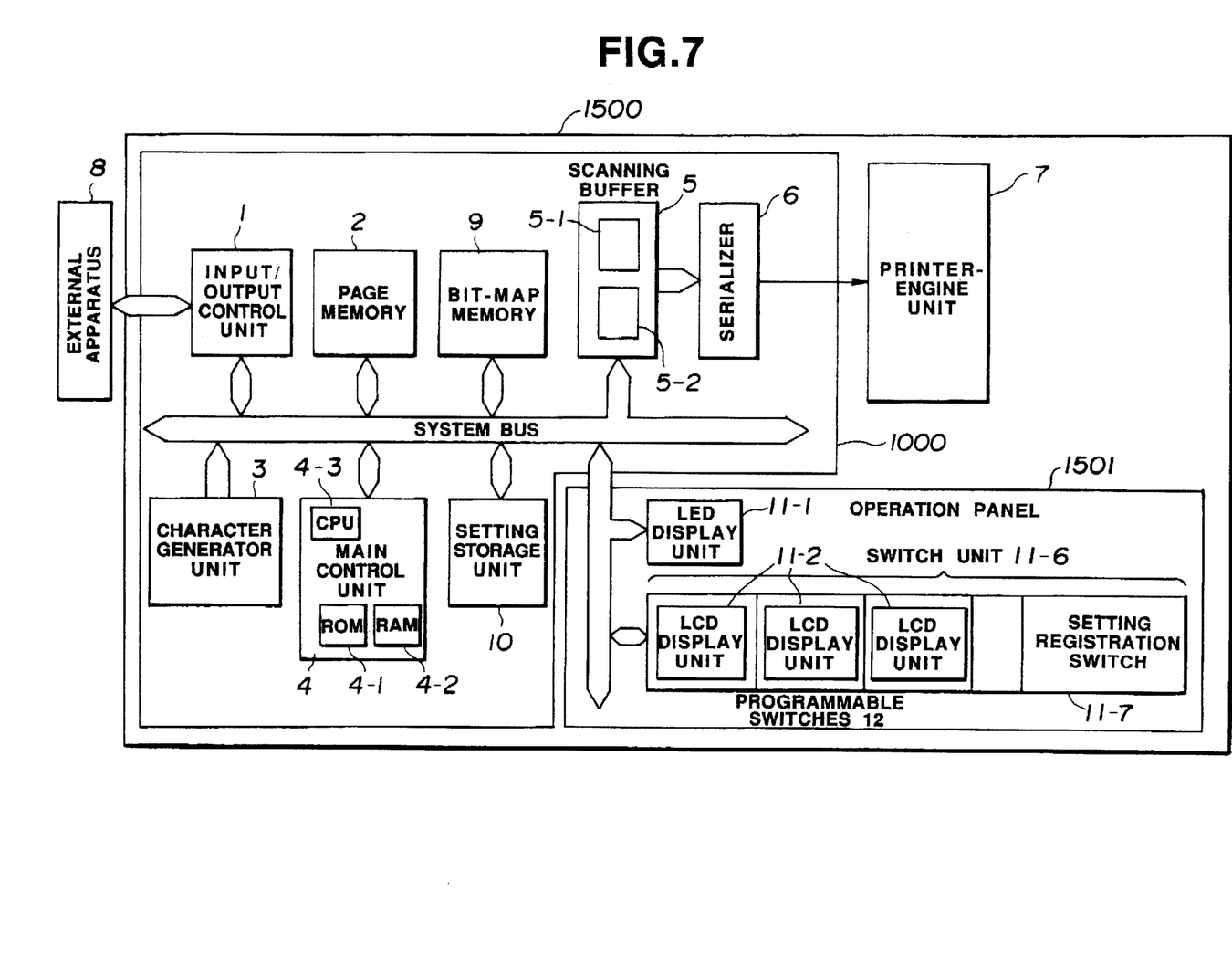
FIG. 7 is a block diagram showing the configuration of a printing apparatus according to a third embodiment of the present invention.

An LCD display unit 11-2 shown in FIG. 5 may be individually provided for each of the programmable switches 12, as in the block diagram showing the configuration of a printing apparatus according to a third embodiment of the present invention shown in FIG. 7, so that when the user switches the setting of the printing apparatus, the set contents registered in each of the programmable switches 12 can be always confirmed on each of the LCD display units 11-2. The operation of the third embodiment is performed in accordance with the flowcharts shown in FIGS. 6 and 8 in a manner similar to that of the second embodiment.

The individual components shown in outline and designated by blocks in the drawings are all well-known in the image recording arts and their specific instruction and operation are not critical to the operation or best mode of carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications ans equivalent structures and functions.

What is claimed is:

1. An outputting apparatus comprising:
    set-up means for setting up each of a plurality of combinations of settings;
    receiving means for receiving a combination of settings for said outputting apparatus as set by an external apparatus;
    storage means for storing at least one of the combination of settings for said outputting apparatus received by said receiving means and one of the plurality of combinations of settings set by said set-up means; and
    control means for controlling an operation of said outputting apparatus on a basis of the combination of settings stored in said storage means such that priority may be given to the combination of settings set by the external apparatus for controlling the operation of the outputting apparatus.

2. An outputting apparatus according to claim 1, wherein the combination of settings correspond to information for setting up paper cassettes.

3. An outputting apparatus according to claim 2, further comprising printing means for printing an image on a paper disposed in the paper cassettes.

4. A setting method of an outputting apparatus having set-up means for setting up each of a plurality of combinations of settings, said method comprising the steps of:
    receiving a combination of settings for the outputting apparatus as set by an external apparatus;
    storing at least one of the received combination of settings for the outputting apparatus and the plurality of combinations of settings set by said set-up means in a memory; and
    controlling an operation of the outputting apparatus on the basis of the combination of settings stored in the memory such that priority may be given to the combination of settings set by the external apparatus for controlling the operation of the outputting apparatus.

5. A setting method according to claim 4, wherein the combinations of settings correspond to information for setting up paper cassettes.

6. An outputting apparatus according to claim 1, wherein the combination of settings correspond to information for setting up font types.

7. An outputting apparatus according to claim 1, wherein the combination of settings correspond to information for setting up font pitches.

8. An outputting apparatus according to claim 1, wherein the combination of settings correspond to information for setting up font sizes.

9. An outputting apparatus according to claim 1, wherein the plurality of combinations of settings are set for each user.

10. A setting method according to claim 4, wherein the combination of settings correspond to information for setting up font types.

11. A setting method according to claim 4, wherein the combination of settings correspond to information for setting up font pitches.

12. A setting method according to claim 4, wherein the combination of settings correspond to information for setting up font sizes.

13. A setting method according to claim 4, wherein the plurality of combinations of settings are set for each user.

14. A memory medium storing a program for performing a setting method of an outputting apparatus having set-up means for setting up each of a plurality of combinations of settings, the method performed by the program stored on the memory medium comprising the steps of:
    receiving a combination of settings for the outputting apparatus as set by an external apparatus;
    storing at least one of the received combination of settings for the outputting apparatus and the plurality of combinations of settings set by said set-up means in a memory; and
    controlling an operation of the outputting apparatus on the basis of the combination of settings stored in the memory such that priority may be given to the combination of settings set by the external apparatus for controlling the operation of the outputting apparatus.

15. A memory medium according to claim 14, wherein the combination of settings correspond to information for setting up paper cassettes.

16. A memory medium according to claim 14, wherein the combination of settings correspond to information for setting up font types.

17. A memory medium according to claim 14, wherein the combination of settings correspond to information for setting up font pitches.

18. A memory medium according to claim 14, wherein the combination of settings correspond to information for setting up font sizes.

19. A memory medium according to claim 14, wherein the plurality of combinations of settings are set for each user.

20. A program product for performing a setting method of an outputting apparatus having set-up means for setting up each of a plurality of combinations of settings, the method performed by the program product comprising the steps of:
    receiving a combination of settings for the outputting apparatus as set by an external apparatus;
    storing at least one of the received combination of settings for the outputting apparatus and the plurality of combinations of settings set by said set-up means in a memory; and
    controlling an operation of the outputting apparatus on the basis of the combination of settings stored in the memory such that priority may be given to the combination of settings set by the external apparatus for controlling the operation of the outputting apparatus.

21. A program product according to claim 20, wherein the combination of settings correspond to information for setting up paper cassettes.

22. A program product according to claim 20, wherein the combination of settings correspond to information for setting up font types.

23. A program product according to claim 20, wherein the combination of settings correspond to information for setting up font pitches.

24. A program product according to claim 20, wherein the combination of settings correspond to information for setting up font sizes.

25. A program product according to claim 20, wherein the plurality of combinations of settings are set for each user.

* * * * *

UNITED STATES PATENT AND TRADEMARK OFFICE
CERTIFICATE OF CORRECTION

PATENT NO. : 5,696,891
DATED      : December 9, 1997
INVENTOR(S) : Ide

It is certified that error appears in the above-identified patent and that said Letters Patent is hereby corrected as shown below: On the title page;

[56] References Cited:

FOREIGN PATENT DOCUMENTS

"2220286  4/1990  United Kingdom" should read
--2220286  1/1990  United Kingdom--.

COLUMN 5:

Line 64, "kinds" should read --kinds or groups--.

COLUMN 6:

Line 5, "rality" should read --rality or groups--; and
Line 46, "Or" should read --or--, and "kinds"
    should read --kinds or groups--.

COLUMN 9:

Line 22, "ans" should read --and--.

Signed and Sealed this

First Day of September, 1998

Attest:

BRUCE LEHMAN

Attesting Officer

Commissioner of Patents and Trademarks